United States Patent [19]

Holt

[11] 4,016,438
[45] Apr. 5, 1977

[54] ENTHALPY AUGMENTATION TO MHD GENERATION

[75] Inventor: James F. Holt, Medway, Ohio

[73] Assignee: The United States of America as represented by the Secretary of the Air Force, Washington, D.C.

[22] Filed: May 27, 1975

[21] Appl. No.: 581,175

[52] U.S. Cl. .............................................. 310/11
[51] Int. Cl.² ...................................... H02K 45/00
[58] Field of Search ................... 310/11, 4, 10; 315/111.4

[56] References Cited

UNITED STATES PATENTS

| 1,717,413 | 6/1929 | Rudenberg | 310/4 |
|---|---|---|---|
| 1,916,076 | 6/1933 | Rupp | 310/11 |
| 3,080,515 | 3/1963 | Kehoe | 310/11 X |
| 3,278,798 | 10/1966 | Fabre et al. | 315/111.4 |
| 3,339,092 | 8/1967 | Fröhlich | 310/11 |
| 3,355,605 | 11/1967 | Okress | 310/11 |
| 3,374,370 | 3/1968 | Swift-Hook | 310/11 |
| 3,436,918 | 4/1969 | Brogan et al. | 310/11 X |
| 3,479,537 | 11/1969 | Jenny et al. | 310/11 |
| 3,480,805 | 11/1969 | Yerrell | 310/11 |
| 3,505,550 | 4/1970 | Levoy et al. | 310/11 X |
| 3,524,086 | 8/1970 | Lindley | 310/11 |
| 3,736,447 | 5/1973 | Fauderer | 310/11 |

*Primary Examiner* — Donovan F. Duggan
*Attorney, Agent, or Firm* — Joseph E. Rusz; Robert Kern Duncan

[57] ABSTRACT

An improved magnetohydrodynamic (MHD) generator is provided by increasing the electrical conductivity of the working fluid by raising the temperature of the fluid. This is accomplished by providing an additional source of heat for the combustion products within the combustor. The additional source of heat in the combustor is provided by an electrical arc discharge within the combustor. The arc is energized by feeding back a part of the electrical output power from the MHD generator to the arc electrodes. In a typical nominal 20 megawatt system the thermal efficiency of the system is typically increased from approximately 20% to approximately 24.5% by such enthalpy augmentation.

1 Claim, 2 Drawing Figures

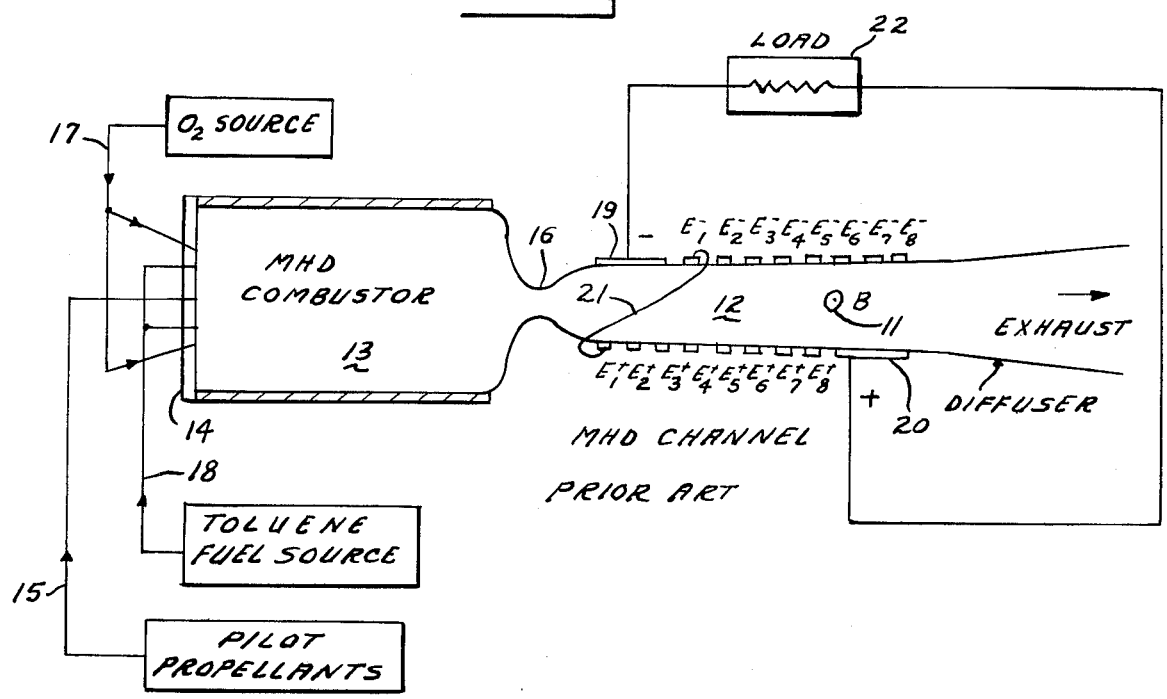
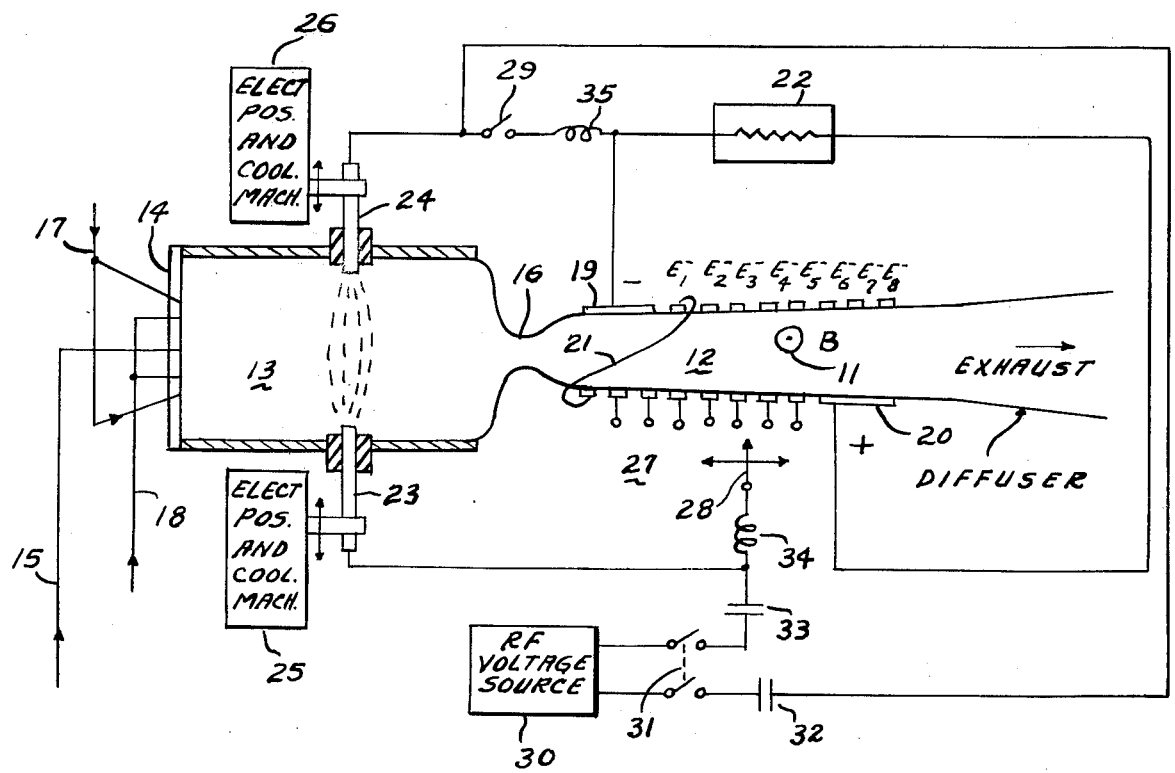

ENTHALPY AUGMENTATION TO MHD GENERATION

RIGHTS OF THE GOVERNMENT

The invention described herein may be manufactured and used by or for the Government of the United States for all governmental purposes without the payment of any royalty.

BACKGROUND OF THE INVENTION

The field of the invention is in the MHD generator art.

In conventional combustion driven MHD generators, of the open cycle type, with the working fluid consisting of a seeded gas of combustion products, the electrical conductivity of the working fluid is not as high as desirable. This is because the flame temperature with typical hydrocarbon fuels is substantially limited to a definite determined amount, and this limits the conductivity of the working fluid in the MHD channel.

Typical examples of prior art MHD generators are described in U.S. Pat. No. 3,278,798 to patentees J. Fabre et al; U.S. Pat. No. 3,297,890 to patentee T. R. Brogan; U.S. Pat. No. 3,524,086 to patentee B. C. Lindley; and U.S. Pat. No. 3,553,503 to patentee L. R. O'Hare. U.S. Pat. No. 3,278,798 disclosed the addition of a plurality of pulsed electric arc discharges in the MHD channel.

SUMMARY OF THE INVENTION

An improved MHD generator is provided by feeding some of the electrical output energy back into an arc discharge in the combustor. This augments the enthalpy of the working fluid in the combustor which in turn increases the conductivity of the fluid, decreases the internal impedance of the generator, and provides a net increase in the output power of the MHD generator after subtracting that amount of power taken by the augmenting arc from the system.

BRIEF DESCRIPTION OF THE DRAWING

FIG. 1 is a schematic diagram of a typical prior art MHD generating system; and

FIG. 2 is a schematic diagram of a typical embodiment of the invention for improving the system represented in FIG. 1.

DESCRIPTION OF THE PREFERRED EMBODIMENT

A typical prior art combustion driven MHD generator of the open cycle type with the working fluid being a seeded gas of combustion products is represented schematically in FIG. 1. An embodiment of an improved system as applied to the prior art system of FIG. 1 is diagrammed schematically in FIG. 2. FIG. 2 illustrates the feeding back of some of the output energy from the MHD channel into the combustor chamber to increase the enthalpy of the working fluid. Because the additional heat source requires a certain percentage of the original combustion enthalpy in the combustor to produce a given increase in temperature, the net gain in output power in applying this invention will be positive only when the original thermal efficiency, electrical power output divided by the original enthalpy input to the combustor times 100, is above a certain threshold, generally in the neighborhood of 20 percent. This threshold level depends upon the particular propellant used and upon the relationship between electrical conductivity and temperature. For this reason the working embodiment further described in detail as illustrative of the invention is described for an unaugmented system having a thermal efficiency of approximately 20%; the minimum size of a typical system to achieve this high an efficiency must be roughly 20 megawatts, which is generally smaller than most commercial power line generators for base stations. FIG. 1 represents schematically such a prior art system. A magnetic field 11, as represented by B coming out of the plane of the paper, of approximately three Tesla is set up through the MHD channel 12 for continuous operation. The pilot flame and propellant are injected into the combustor chamber 13 through the fuel plate 14 from line 15. The combustion that takes place in the combustion chamber 13 supplies a flame having an interior temperature of approximately 3400° Kelvin and a static pressure of about 10 atmospheres. The combustion product gases flow through the nozzle 16 and through the MHD channel 12 at approximately Mach 2 and a static pressure of about 1 atmosphere. The magnitude of the propellant flow is generally assumed to provide approximately 100 megawatts of thermal power into the combustor. Potassium carbonate seed is added to the oxygen flow going into the combustor on line 17 so as to provide a conductivity in the MHD channel 12 at approximately 10.6 mhos/meter. The static temperature of the gas in the channel is approximately 2600° Kelvin. The MHD channel 12 of the prior art device being described is a conventional segmented electrode, diagonal type. The output electrodes 19 and 20 at the ends are generally somewhat longer than those in the middle region represented by $E_1$ through $E_N$ of both plus and minus polarities. The walls of the channel perpendicular to the direction of the magnetic field are fabricated of insulating material. The top electrodes are connected to the bottom electrodes, as indicated by conductor 21 connecting $E^-_1$ to $E^+_1$, for all the electrodes, i.e., $E^-_2$ to $E^+_2$, etc. The electrical power from the output electrodes 19 and 20 of the system, is supplied to representative load 22. The conventional prior art MHD generator just described supplies approximately 20 megawatts of power to load 22. The operation of the heating gas is generally characterized as being an equilibrium situation.

The invention is a combination of apparatus modifying and improving the operation of a conventional MHD generator as illustrated in FIG. 1 to provide the novel apparatus illustrated in FIG. 2. It has been discovered that in MHD systems having an original efficiency of approximately 20% or over, that by taking some of the electrical energy from the generator and feeding it back into the combustor chamber to augment the enthalpy, that the output power from the channel is increased more than that amount fed back into the combustor resulting in a net increase in total power output from the system. The typical combustor chamber 13 is fitted with electric arc apparatus comprising the conventional carbon electrodes 23 and 24. Conventional arc electrode positioning and cooling mechanisms 25 and 26 maintain approximately constant arc spacing by compensating for the wearing or eroding away of the electrodes. They also provide conventional water cooling of the electrodes to provide longer electrode life. The amount of power extracted from the output and fed back to the combustor chamber generally is approximately 20% of the unaugmented power output. In the specific embodiment being described in detail the conventional MHD generator had a nominal output of 20 megawatts. Approximately 3.7 megawatts of power fed back into the combustor provided optimum operation of the system. In this specific system, after enthalpy augmentation by feeding 3.7 megawatts back into the combustor, the combustor temperature increased to over 3500° Kelvin, the temperature of the combustion products in the MHD channel 12, increased to approximately 2700° Kelvin, and the electrical conductivity of the gas in the channel increased to approximately 15 mhos/m. The total power output from the MHD channel increased from 20 megawatts to 28.2 megawatts for a net gain in power output from the system to the load 22 of 4.5 megawatts. (8.2 megawatts additional generated minus the 3.7 megawatts fed back into the system.) The net gain in thermal efficiency of the system is increased from 20% before augmentation to 24.5% after starting the arc.

Generally, it is desirable to provide a means for adjusting the amount of power fed back into the combustor. This is particularly true for first installations where optimum parameters have not previously been established. Thus, in the embodiment illustrated schematically in FIG. 2 taps 27 from the electrodes to a multiple position switch 28 are provided so that the voltage across the arc may be adjusted to provide the proper amount of power going into the arc to provide for optimum performance of the system. After the proper amount of feed back for a particular system has been established the adjustable feature need not be incorporated, and a permanent connection for the feed back made. In many applications of the invention a nominal feed back power level of approximately 20% of the nominal unaugmented output power is satisfactory and optimization is not necessary. However, when the thousands of megawatts used in commercial applications are considered even a saving of 1% can be very significant.

Usually, to start the arc at the beginning of augmentation, after the MHD generator is running conventionally, all that is necessary is to close switch 29. However to ensure that the arc always establishes, it is desirable that an additional starting means be provided. One conventional way of starting an electric arc, which may be used with this invention, is to actuate the conventional electrode positioning mechanisms of 25 and 26 to bring the electrodes into momentary contact and then rapidly draw the electrodes apart establishing the arc. A generally preferred way to start the arc, which does not involve physically altering the electrode positions from that of their normal operating positions, is by bridging the gap between the electrodes with a radio frequency discharge. The radio frequency arc initially breaks down the gap then the dc voltage flows over the ionization path established by the radio frequency discharge and maintains the arc discharge after removal of the radio frequency voltage. Conventional radio frequency generator 30, whose radio frequency is not critical and may be from a few kilohertz to several megahertz, provides sufficient voltage and power to establish the arc and maintain a discharge across the electrodes. Thus, at start-up after the MHD generator is operating conventionally, switch 29 is closed. If the discharge between the electrodes 23 and 24 does not commence, switch 31 is closed and the radio frequency energy from the radio frequency voltage source 30 is applied to the electrodes 23 and 24 through the conventional radio frequency coupling capacitors 32 and 33. The duration that radio frequency voltage is applied is not critical. It preferably should be just a momentary application with the radio frequency voltage applied just long enough to assure that the dc arc is established. Conventional radio frequency choke coils 34 and 35 prevent the radio frequency energy from flowing into the MHD channel thus providing for the full radio frequency voltage to appear across the electrodes, yet provide for the dc voltage from the MHD channel to flow to the electrodes. Obviously, the coils 34 and 35 must be of suitable construction to carry the current for the arc discharge.

The success of the invention lies in the proportionality between power density output of the MHD channel and electrical conductivity of the flowing gas, plus the fact that the conductivity is an exponential function of the gas temperature. It is recognized that if no enthalpy were lost from the flowing plasma excepting to the load resistor through MHD conversion, then in order to achieve maximum thermal efficiency, the channel would be designed to be as long as possible under the other constraints of design so as to achieve the utmost efficiency regardless of the magnitude of the electrical plasma conductivity. Thus, by utilizing a longer MHD channel more power could be extracted; i.e., ideally, with series connected electrodes the current stays substantially constant while the voltage increases, or in a parallel electrode arrangement the internal resistance decreases and the current increases with the output voltage remaining substantially constant. In either instance, with a given gas conductivity, the output power ideally increases with increasing the length of the MHD channel. However, even in very large MHD systems this ideal condition is not reached or even approximated, as considerable power is lost to the walls and to the gas dynamic boundary layer. Therefore, there is a practical limitation on the thermal efficiency, with a given electrical conductivity, which is caused by this extra heat loss. The result is that the channel is not made as long as ideally it would be.

By the augmentation principle as taught herein, the electrical conductivity is increased so that greater interaction is achieved by a given channel, or the same efficiency can be achieved by a significantly shorter channel. In addition there are other advantages to the augmentation of the combustion. By operating the combustion gas at a temperature higher than its normal flame temperature, when liquid or solid fuel particles are used, complete combustion of fuel droplets or particles will take place in a shorter time. With a given combustor, the increased temperature thus ensures more complete combustion and a greater system thermal efficiency. Another effect of higher temperature, of the combustion gas, is that there is a lower fraction of free oxygen in it and throughout the system, thus, reducing oxidation effects on the MHD hardware.

The foregoing description of the advantages is simplified in that it neglects some second order losses of the system which reduces the amount of increase in efficiency that would otherwise be realized. One of these effects is the slight increase in thermal power loss through the walls of the combustor and channel after the increased temperature. Another consideration is that the original channel would be designed for maximum power output under the operating conditions without the arc, while the channel with the arc operating would be ideally designed a little differently. That is, the same channel cannot exactly optimize both methods of operation. Thus, the invention as disclosed may be applied to improve existing systems or incorporated in completely new improved MHD generating systems.

I claim:

1. In a MHD generator having at least a thermal efficiency of approximately 20%, a combustion chamber, a MHD channel having a plurality of serially connected electrodes between positive and negative electrical output electrodes with an electrical load connected to the said positive and negative output electrodes, the improvement in the said MHD generator by enthalpy augmentation comprising:

a. a first and a second carbon electrode for providing an electrical arc discharge therebetween;
b. means for positioning the said electrodes to position the said arc discharge in the said combustion chamber;
c. means including a switch cooperating with the said plurality of electrodes and one of the said output electrodes to provide an adjustable voltage; and
d. means for connecting the said adjustable voltage to the said carbon electrodes.

* * * * *